United States Patent
Gould et al.

(10) Patent No.: US 6,934,548 B1
(45) Date of Patent: Aug. 23, 2005

(54) METHODS FOR DETECTING, COMPUTING AND DISSEMINATING LOCATION INFORMATION ASSOCIATED WITH EMERGENCY 911 WIRELESS TRANSMISSIONS

(76) Inventors: Lawrence A. Gould, 18181 NE. 31 Ct., Apt. #409, Aventura, FL (US) 33160; John A. Stangle, 128 Bower La., Forest Hill, MD (US) 21050

( * ) Notice: Subject to any disclaimer, the term of this patent is extended or adjusted under 35 U.S.C. 154(b) by 553 days.

(21) Appl. No.: 09/927,992

(22) Filed: Aug. 10, 2001

(51) Int. Cl.[7] .................................................. H04Q 7/20
(52) U.S. Cl. ................ 455/456.1; 455/521; 455/404.1; 455/404.2; 455/456.5; 342/357.1; 342/357.8; 701/207
(58) Field of Search .......................... 455/404.1, 404.2, 455/414.2, 439, 456.1–457, 521; 370/310.2, 331; 342/357.01, 357.07, 357.08, 367; 701/207, 213, 214

(56) References Cited

U.S. PATENT DOCUMENTS

| | | | | |
|---|---|---|---|---|
| 5,208,756 A | * | 5/1993 | Song | 455/456.3 |
| 5,432,841 A | * | 7/1995 | Rimer | 455/457 |
| 5,646,632 A | * | 7/1997 | Khan et al. | 342/375 |
| 5,764,188 A | * | 6/1998 | Ghosh et al. | 342/457 |
| 5,883,598 A | * | 3/1999 | Parl et al. | 342/457 |
| 6,167,275 A | * | 12/2000 | Oros et al. | 455/456.2 |
| 6,212,392 B1 | * | 4/2001 | Fitch et al. | 455/456.2 |
| 6,252,867 B1 | * | 6/2001 | Pfeil et al. | 370/335 |
| 6,438,380 B1 | * | 8/2002 | Bi et al. | 455/456.1 |
| 6,456,852 B2 | * | 9/2002 | Bar et al. | 455/456.1 |

* cited by examiner

Primary Examiner—Stephen D'Agosta
(74) Attorney, Agent, or Firm—Law Offices of John Chupa & Associates, P.C.

(57) ABSTRACT

Systems and methods to determine the location information of an emergency call made from a radiotelephone. The system employs multiple radio direction finding (RDF) devices, which is capable of determining the angle of arrival of a radio signal. The MSC sends a request along with radio information to a location processor, which controls RDF devices. The location processor sets up each RDF device to track the radio signal. If at least two RDF devices are successful in tracking the radio signals and returning information about the radio signal, then the location processor can determine the location of the radiotelephone by using a triangulation method.

3 Claims, 5 Drawing Sheets

DEFINITIONS $d_1$ is the perpendicular distance from Source, S, to the vector, V, connecting $T_1$ and $T_2$
D is the derived distance from S to $T_1$
V is the length of the vector from $T_1$ to $T_2$
$v_1$ is the distance from $T_1$ to $d_1$
$t_1$ is the angle from S to $T_2$
$t_{12}$ is the angle at $T_1$ from the vector, V, to a line representing the Latitude of $T_1$
$t_2$ is the angle from S to $T_1$
V is the sum of $v_1$ and $v_2$ $v_1$ = V ( tangent $t_2$ ) / [(tangent $t_1$) + (tangent $t_2$)] ----- Equation 1

D = $v_1$ / cos $t_1$ ---------------- Equation 2

Source Latitude = $T_1$ Latitude + D sin ($t_1$ + $t_{12}$) -------- Equation 3

Source Longitude = $T_1$ Longitude + D cos ($t_1$ + $t_{12}$) ----- Equation 4

FIG 5

METHODS FOR DETECTING, COMPUTING AND DISSEMINATING LOCATION INFORMATION ASSOCIATED WITH EMERGENCY 911 WIRELESS TRANSMISSIONS

RELATED APPLICATION

This application is related to the U.S. patent application. Ser. No. 09/927,192, Method for Employing Location Information Associated with Emergency 911 Wireless Transmissions for Supplementary and Complementary Purposes, filed on Aug. 10, 2001, which is incorporated herein by reference. The application also claims priority to the U.S. Provisional Application No. 60/276,120, Method for Determining, Computing and Disseminating Location Information Associated with Emergency 911 Wireless Transmissions, filed on Mar. 16, 2001, the U. S. Provisional Application No. 60/276,122, Method for Detecting, Computing and Disseminating Location Information Associated with Emergency 911 Wireless Transmissions, filed on Mar. 16, 2001, and the U.S. Provisional Application No. 60/276,124, Method for Detecting, Computing and Disseminating Location Information Associated with Emergency 911 Wireless Transmissions, filed on Mar. 16, 2001. All referenced provisional applications are herein incorporated by reference.

TECHNICAL FIELD

This invention is related to the field of telecommunications, particularly to radiotelephony, and more particularly to locating a radiotelephony device in a radiotelephony system.

BACKGROUND OF THE INVENTION

The advent of mobile communication technology has led to the proliferation of radiotelephones (also known as wireless telephone). Now, a person can carry with them a radiotelephone anywhere they go. A person can make a telephone call from almost anywhere to another person and can also receive a telephone call from anywhere.

Increasingly, radiotelephones are used in emergency situations to reach 911 emergency dispatchers. When handling 911 emergency telephone calls, it is important for the dispatchers to learn the physical location of callers. The physical location of a caller using an ordinary telephone connected to the Public Switched Telephone Network (PSTN) is easily obtainable, since the telephone is associated with a physical address stored in a database. There are no physical locations associated with radiotelephones.

It is not possible to determine the physical location of a radiotelephone, when the radiotelephone is capable of moving from one location to another. Radiotelephones are generally linked to the PSTN through a network of antennas, base stations, and mobile switching centers. Each radiotelephone is in communication with at least one antenna and switches from one antenna to another when it moves from one antenna cell to another antenna cell. Although each radiotelephone is associated with a telephone number, the telephone number does not translate into a fixed physical location. Furthermore, the knowledge of which antenna the radiotelephone is in communication with does not form a basis for determining the location of the radiotelephone itself.

Global Positioning System (GPS) has been employed to locate mobile devices. GPS is a satellite based system originally developed by the United States military for navigational purposes, but now it is also available for commercial purposes. GPS uses time of arrival (TOA) and triangulations for location calculation. GPS can provide accurate position information from a time-based signal received simultaneously from at least three satellites. A ground-based GPS receiver at or near the object to be located determines the difference between the time at which each satellite transmits a time signal and the time at which the signal is received and determines the object's location based on the time differentials. The accuracy provided by commercial GPS is within 100 meters. However, the employment of a GPS system is impractical in many applications. The signal power levels from the satellites are low and the GPS receiver requires a clear, line-of-sight path to at least three satellites above a horizon of about 60 degrees for effective operation. Moreover, inclement weather conditions, terrain features, and buildings further restrict the ability of the GPS receiver to determine its position. The GPS system also requires mobile devices to be equipped to link to earth satellites which makes these mobile devices more expensive.

Other techniques based upon signal strength and trilaterialization have been employed, but they are generally effective in line-of-sight conditions, such as rural settings. However, these techniques are not effective in dense urban areas.

In dense urban areas, radio waves reflect on buildings before reaching a receiving antenna on a mobile device, and the mobile device receives radio signals both directly from an emitting antenna and from reflections. This phenomenon is known as multipath signals, and it is well known in the wireless telephony art. The multipath phenomenon renders most analytical location computational techniques such as time-of-arrival (TOA) or time-difference-of-arrival (TDOA) substantially useless in urban areas.

SUMMARY OF THE INVENTION

Briefly described, the present invention is a system and method for determining the geographical position of a radiotelephone device in communication with a wireless communication network. A system according to the present invention employs multiple radio-action-finding (RDF) devices in multiple wireless transmission antenna sites, one RDF device per each transmission antenna site. The RDF devices are connected to a location processor, where the position calculations are performed. The location processor is in communication with a Mobile Switching Center (MSC) that is handling the communication with the radiotelephone.

A caller using a radiotelephone to communicate with a Public Safety Answering Point (PSAP) is tracked by a system according to the present invention, and his position is determined by a method disclosed in the present invention. When a radiotelephone caller, dials an emergency number, typically 911, the call is received by a wireless transmission antenna and sent to a base station (BS). The BS forwards the information to a mobile switching center (MSC), where it is interpreted. When the MSC determines the call is an emergency call, the MSC alerts a location processor to determine the physical location. The MSC also proceeds to forward the call to a PSAP.

The location processor is a processor that controls a plurality of RDF devices and determines the location of a radio signal's source. The location processor obtains the radio signal's information (frequency, time slot, channel, etc.) from the MSC and sends this information to the RDF devices. Each RDF device attempts to determine the angle of arrival of radio signals relative to the position of the RDF device. Preferably, two or more RDF devices can determine the angles of arrival. This information is sent to the location processor.

The location processor uses the angle of arrival information and the information on the location of RDF devices to calculate the geographical coordinates of the source of radio signal. The geographical coordinates calculated are then used to determine the street address of the caller.

If more than two RDF devices detect the radio signal, the location processor will determine several pairs of geographical coordinates by pairing RDF devices differently. Using these pairs of geographical coordinates the location processor will determine the location of the source of the radio signal.

If only one RDF device detects the radio signal, then the angle of arrival is provided to the MSC and the location processor does not calculate the location of the radio signal's source.

In an alternate embodiment, the system according to the present invention may handle more than one request at a time to determine the location of an emergency caller. The MSC can prioritize the calls and the location processor will handle multiple requests according to their priority.

DESCRIPTION OF THE DRAWINGS

The foregoing and other aspects and advantages of the invention described herein will be better understood from the following detailed description of one or more preferred embodiments of the invention with reference to the drawings in which.

DETAIL DESCRIPTION OF THE INVENTION

Figure 1:
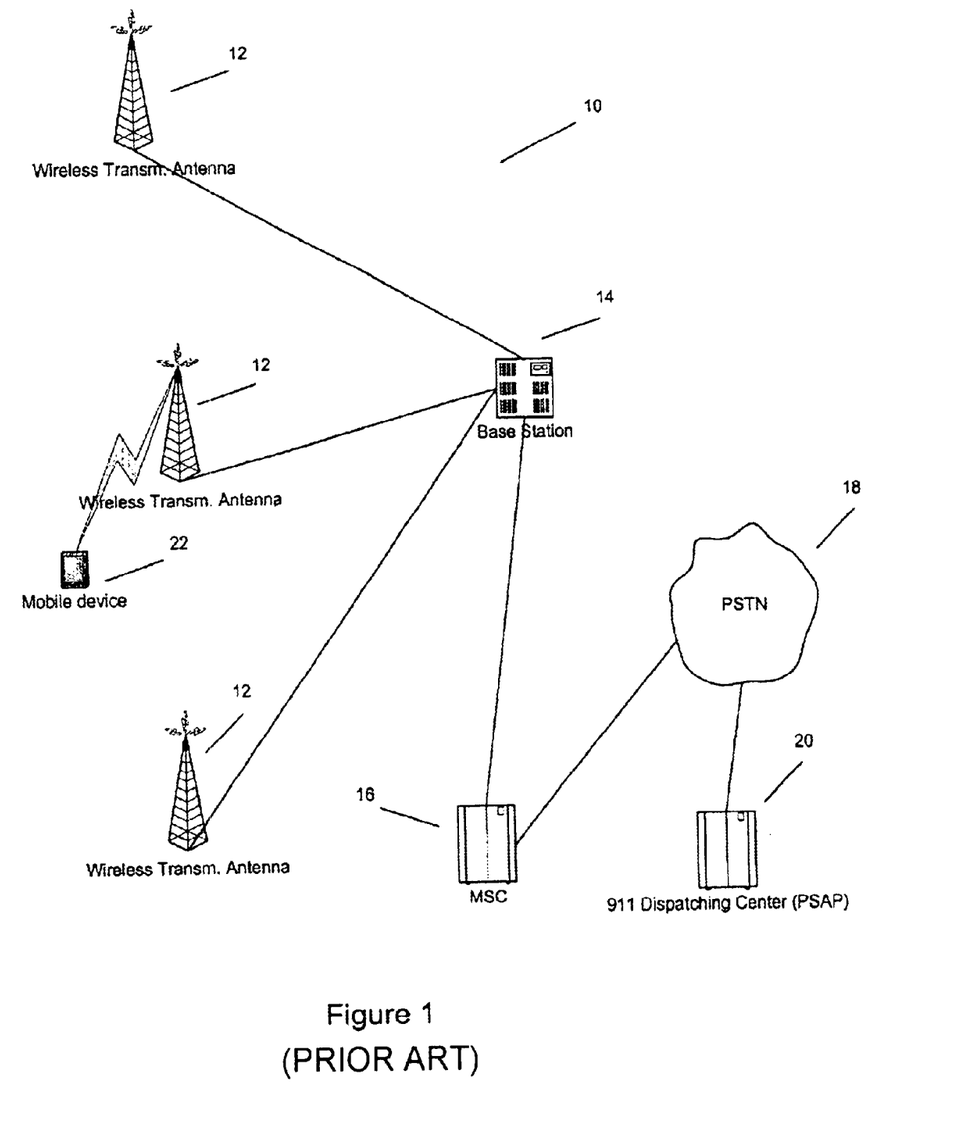
FIG. 1 depicts architecture of a wireless communication network.

Referring now in greater detail to the drawings, in which like numerals represent like components throughout several views, FIG. 1 depicts architecture of a wireless communication network 10. The wireless communication network 10 has a plurality of communication antennas 12, also known as wireless transmission antennas, connected to a base station (BS) 14. The wireless transmission antennas 12 are distributed geographically to cover a wide area, and each antenna 12 typically covers a "cell." A BS 14 may support one or more transmission antennas 12 and are in communication with a MSC 16. A MSC 16 may support several BS' 14.

The wireless telephone network 10 may employ different technologies, such as CDMA (code division multiple access), TDMA (time division multiple access), GSM (Global System for Mobile Communications), FDMA (frequency division multiplex access), AMPS (Advanced Mobile Phone Service), etc. Each technology may use a different protocol and method for communication between a radiotelephone 22 and a wireless transmission antenna 12.

The MSC 16 performs call-processing function for the wireless communication. system 10. The MSC 16 routes a call from a mobile device or a radiotelephone 22 to its destination. The call routing may be through a Public Switched Telephone Network (PSTN) 18. If a caller dials 911, an emergency access number, on his radiotelephone 22, the call is received by a transmission antenna 12 and forwarded by a BS to the MSC 16. The MSC 16 routes the call through the PSTN to a 911 Dispatching Center or a Public Safety Answering Point (PSAP) 20, where the call will be answered.

Typically, an operator at PSAP 20 needs to know the location of the call in order to dispatch emergency service personnel to the location, if needed. The location information may be provided by the caller, if the caller knows where he is. The location information may also be obtained from telephone company records, if the telephone used is a traditional wireline telephone. When a call originates from a wireless telephone and the caller cannot report his location, dispatching of emergency service vehicles may be delayed or impossible, unless the wireless communication network 10 is equipped with location finding devices.

Figure 2:
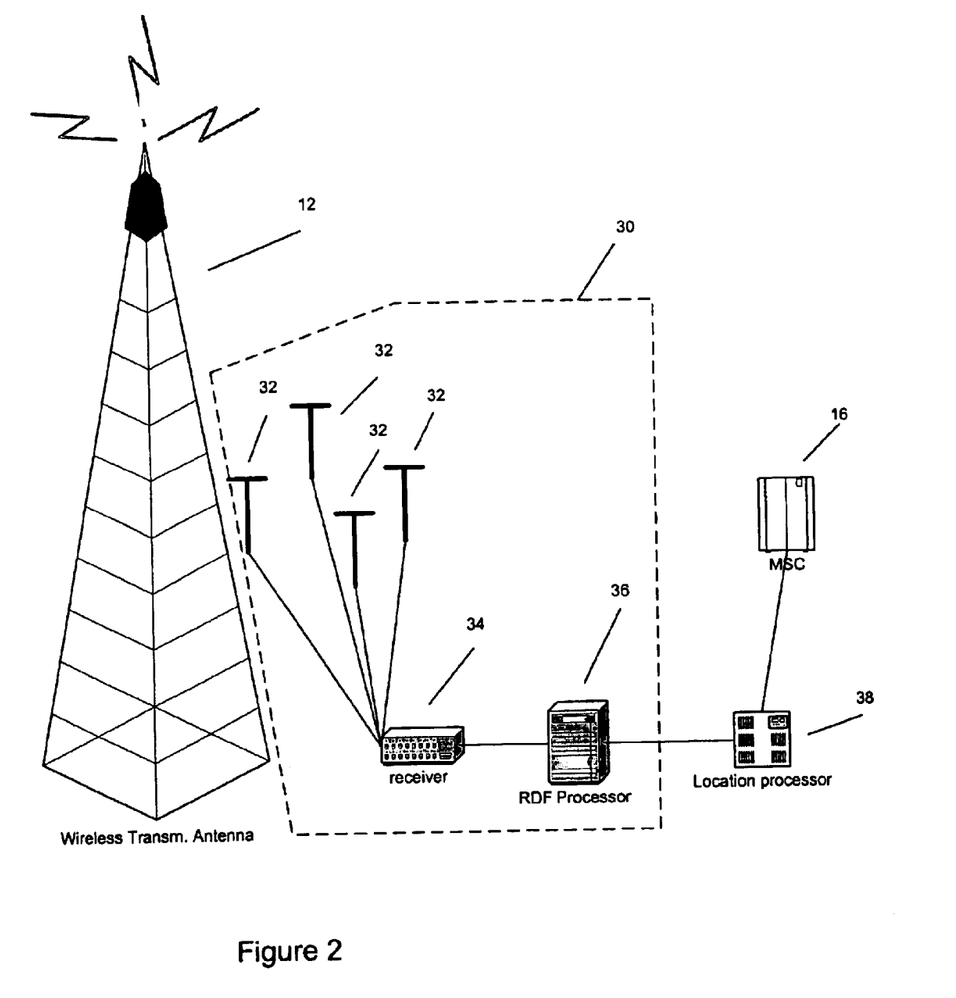
FIG. 2 depicts a RDF device installed on a wireless antenna.

A RDF device installed on a wireless transmission antenna 12 can provide information about the angle of arrival of a radio signal. The present invention employs a commercially available RDF device, which functionality is explained by the U.S Pat. No. 4,263,597, Nondisruptive ADF System, to Bentley (Apr. 21, 1981) and U.S. Pat. No. 4,317,120, Sector Scan ADF System, to Bentley (Feb. 23, 1982). Both aforementioned patents are hereto incorporated by reference. An example of such RDF device is a LF/HF/VHF/UHF/MW Direction Finder from TechComm.

FIG. 2 is an illustration of a RDF device 30 installed on a wireless transmission antenna 12. Generally, one RDF device 30 is installed to one wireless transmission antenna 12. A RDF device 30 typically has a set of antennas 32 connected to a receiver 34 and controlled by a RDF processor 36. The RDF device 30 tries to determine the angle of arrival of a radio signal by sequentially sampling the radio signals through each of the antennas 32 attached to the receiver 34. The receiver 34 demodulates the signal received before sending them to the RDF processor 36 for processing. The RDF processor 36 processes the signal received and attempts to determine the angle of arrival of the signal received. The RDF processor 36 controls the sampling of radio signals by the antennas 32 and determines which radio frequency, channel, or time slots to sample.

In an alternate embodiment, the receiver 34 and the RDF processor 36 may be enclosed in one physical unit, i.e., the receiver 34 and the RDF processor 36 may be different circuits of a single RDF device. In yet another embodiment, the functions of receiver 34 and the RDF processor 36 may be implemented through software in the RDF device.

Generally, the RDF processor 36 is in communication with a location processor 38. The location processor 38 preferably is connected to and receives information from multiple RDF devices 30. The location processor 38 is also connected to a MSC 16. The location processor 38 receives radio signal information, such as radio frequency used, time slot, special code, etc., about the emergency call from the MSC 16.

The radio signal information received from the MSC 16 is dependent on the technology used to implement the wireless network 10. For example, the radio signal information for a CDMA based wireless network is different for a TDMA based wireless network. A GSM based wireless network uses yet another different radio signal information.

The location processor 38 transmits the radio signal information to multiple RDF devices 30, so each RDF device 30 can attempt to track this radio signal. It is preferred if the radio signal from an emergency call can be tracked by more than one RDF device 30. Each RDF device 30 provides a unique angle of arrival information, which when combined with the information from other RDF devices 30 allows calculation of the physical location of the transmitting device.

Figure 3:
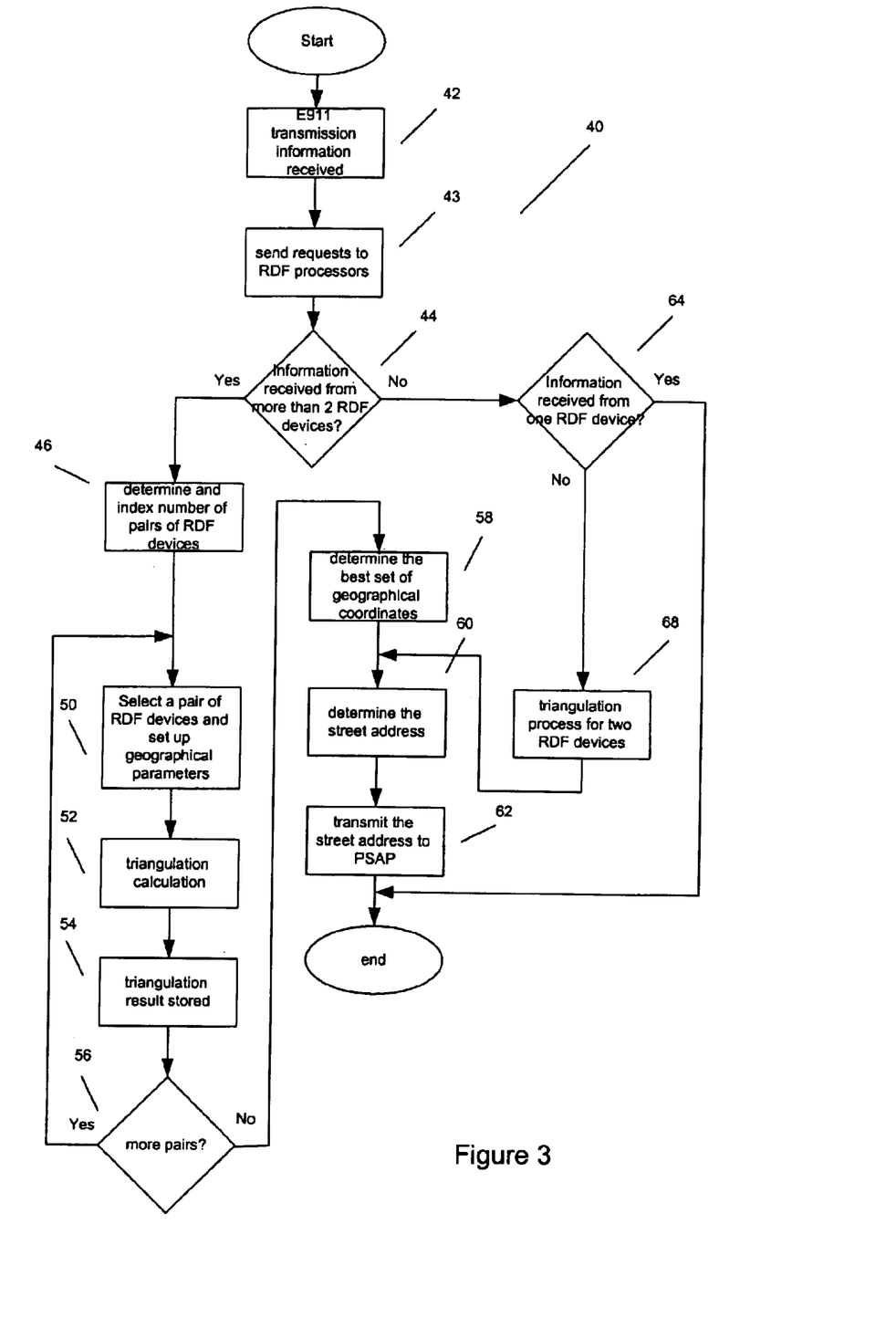
FIG. 3 is a block diagram for a location calculation process.

FIG. 3 is a block diagram of a location calculation process 40 performed by a location processor 38. The process starts when the location processor 38 receives from a MSC 16 information about the radio signal of an emergency call, a 911 call, block 42. The location processor 38 sends this information to RDF devices 30 and requests the RDF devices to scan for the radio signal of this emergency call, block 43. Each RDF device 30 scans for the radio signal and attempts to determine the angle of arrival of the radio signal. After determining the angle of arrival, the RDF devices 30 send this information to a location processor 38.

When a location processor 38 receives information, it checks whether the information is from more than two RDF devices 30, block 44, i.e., whether the radio signal has been "tracked" or "detected" by two or more RDF devices 30. If more than two RDF devices 30 receive the radio signal, they are paired and indexed, block 46. The RDF devices 30 are paired because the calculation process, which uses a triangulation method, requires information from two RDF devices 30. The RDF devices 30 are paired between them in such a way that three RDF devices 30, A, B, and C will yield to three pairs of antennas, AB, BC, and AC.

After the RDF devices 30 are paired and indexed, the location processor 38 selects one pair for calculation, block 50. The geographical parameters of each RFD device, which is the same as the location of the wireless transmission antenna site, are stored in a database accessible to the location processor 38. The geographical parameters include, but not limited to longitude and latitude of each antenna and the distance between the antennas. The geographical parameters are used for the triangulation calculation, block 52.

After the calculation, the result is stored, block 54, and the location processor 38 checks whether there are more RDF device pairs to be calculated, block 56. If there are additional pairs, then blocks 50, 52, and 54 are repeated until all pairs are used for the calculation. The result of the triangulation calculation is a pair of geographical coordinates of the source of the radio signal, i.e., the source's longitude and latitude.

After all pairs have been used for the calculation and all results stored, the location processor 38 proceeds to determine the "best fit" of geographical coordinates, block 58. The best fit of geographical coordinates may be determined by a simple average of coordinates or by a weighted average taking into account any obvious anomalies in location information. If one coordinate is far afield from the others, it may be caused by malfunctioning of an equipment, data contamination, etc., and this should be considered and compensated. Other statistical models may also be used to determine the best fit.

The best fit is recorded, presumed to be accurate, and used to determine the street address. The best fit of geographical latitude and longitude is translated into street or highway addresses that are meaningful to the authorities at the PSAP, block 60. This translation may be performed employing commercially available software and database, such as MAPINFO.

Finally, the street address is transmitted back to the PSAP, block 62, together with other E911 (emergency 911) information associated with this call. The information may be encrypted before the transmission to prevent interception and interference by others.

Back to block 44, if the information on radio signal is not received by more than two RDF devices 30, it is checked whether only one RDF device 30 receives the information, block 64. If only one RDF devices 30 receives the information, then the triangulation method cannot be used and the location of the origin of the radio signal cannot be determined accurately.

If two RDF devices 30 receive the information, then the triangulation method applies only to this pair of RDF devices 30, block 68. The result of the triangulation calculation is used to determine the street address, block 60, and the street address is transmitted to the PSAP, block 62.

Figure 4:
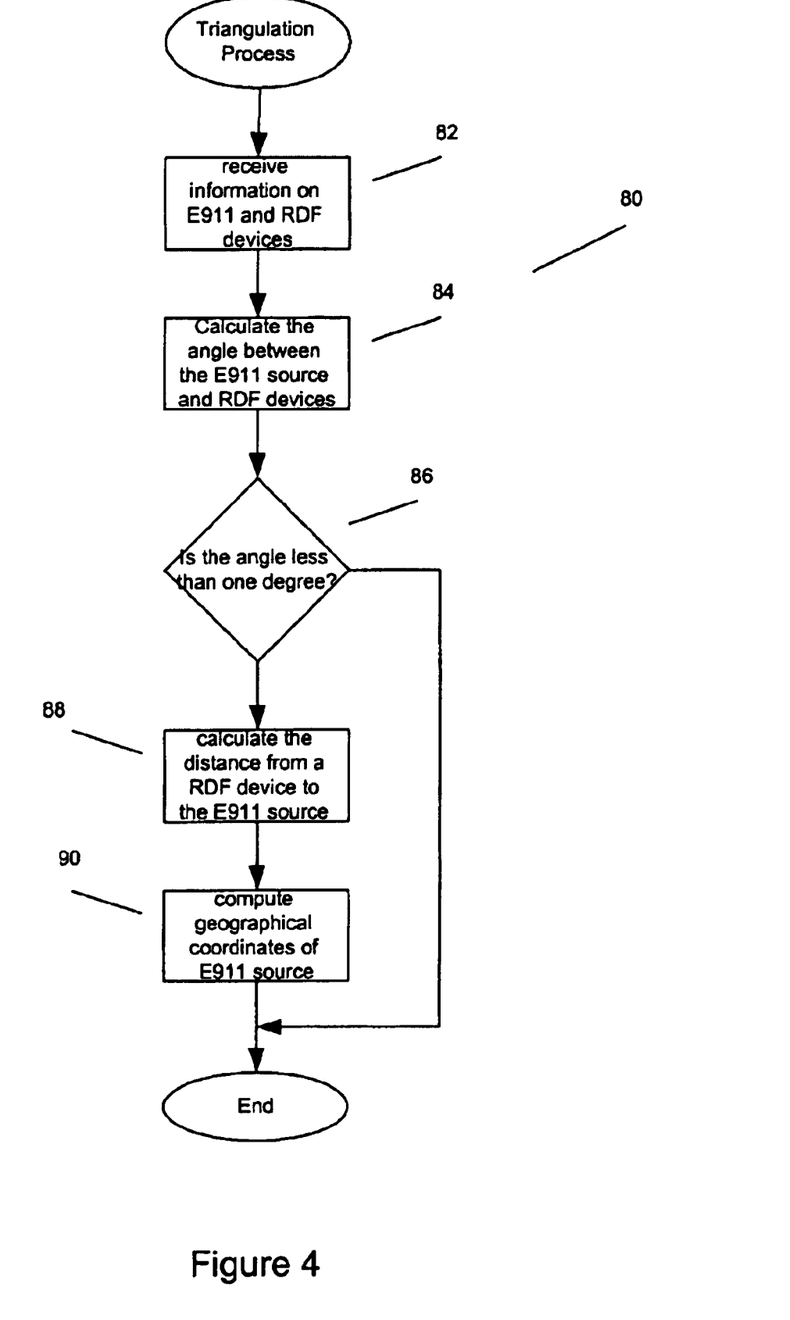
FIG. 4 is a block diagram for a triangulation calculation process.

FIG. 4 illustrates the triangulation calculation process 80. The process starts when the geographical parameters and E911 information are received, block 82. The triangulation process calculates the angle between the E911 source and the RDF devices 30, block 84. A check is made to determine whether the angle calculated is less than one degree, block 86. If the angle is less than one degree, it means that the source of the E911 call lies on the line between two RDF devices 30 and the triangulation method will not give accurate result. If the angle is one degree or more, then the location processor 38 can determine the distance from one RDF device 30 to the E911 source, block 88. Using the distance between a RDF device 30 and the E911 source, the location processor 38 can determine the geographical coordinates for the E911 source, block 90.

Figure 5:
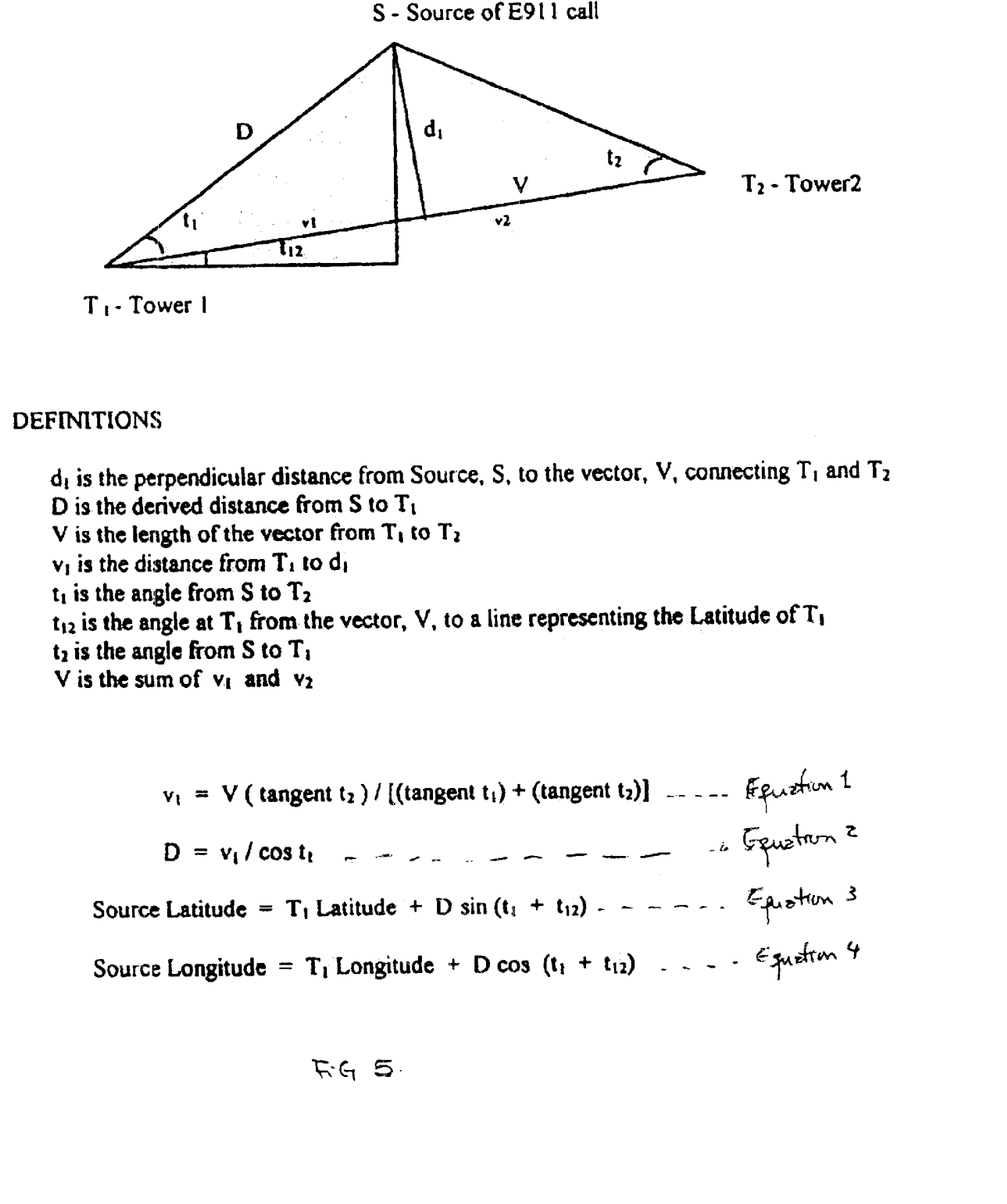
FIG. 5 is an illustration of the triangulation method.

FIG. 5 illustrates the triangulation method. The triangulation method assumes that the position of two points and the distance between them are known The angular information about the third point is also known. The angular information is derived from the angle of arrival information provided by each RDF device.

Equation 1 uses the distance between the two RDF devices, which are represented by the wireless transmission antennas/towers (T1 and T2), and the angular information from two RDF devices to calculate distance v1, which is the distance from a first RDF device to point d1. d1 is a point demarked by a perpendicular line between the E911 source and the line connecting the two RDF devices.

Equation 2 uses v1 to calculate the distance between the first RDF device and the E911 source.

After the distance between the first RDF device and the E911 source is calculated, the E911 source's latitude and longitude can be easily determined using Equations 3 and 4.

In operation, when a person makes a call to an emergency number, such as 911, from a radiotelephone, 22, the call is received by a wireless transmission antenna 12, which is connected to a base station 14. The base station 14 forwards the call to a MSC 16, which attempts to route the call.

After analyzing the dialed number, the MSC 16 identifies the destination number as a number assigned to a PSAP 20. The MSC 16 routes the call to the PSAP 20 and sends a request to locate the source of the call to a location processor 38. The MSC also sends radio signal information related to the emergency call along with the request to the location processor 38. The radio signal information is used for tracking a radio signal and may include frequency, time slot, special code, etc.

The location processor 38 sends the radio signal information to all RDF devices 30. Generally, one RDF device 30 is attached to each wireless transmission antenna 12. The RDF processor 36 of the, RDF device 30 sets-up the antennas 32 to tune-in to the radio signal and samples sequentially all the antennas 32. Each RDF device 30 will return information on the angle of arrival of the radio signal, if it is successful in locating the radio signal. The RDF device 30 sends the results back to the location processor 38.

The location processor 38 can determine the location of an emergency call if the location processor 38 receives the angle of arrival information from at least two RDF devices 30. If the location processor 38 receives the information from more than two RDF devices 30, then the location results can be analyzed and a "best fit" result selected.

The location processor 38 can easily translate the location information, which is expressed as longitude and latitude, into a street address through use of a commercial software or database. The street address is then transmitted to the MSC 16, which in turn sends it to the PSAP 20.

The present invention can easily apply to a system for locating a person in need of emergency medical assistance. If the person is equipped with a medical emergency device capable of placing a wireless call to a medical emergency monitoring center, he can activate the device upon medical emergency situations and he then can be easily located by a medical emergency response team.

In an alternate embodiment, the present invention can also handle multiple emergency calls. The MSC 16 may request the location processor 38 to track multiple emergency calls. The MSC 16 prioritizes the emergency calls and communicates the priority information along with the radio information to the location processor 38. The location processor 38 will calculate the origin of these calls according to the priority.

The foregoing description of preferred embodiments of the invention has been presented only for the purpose of illustration and description and is not intended to be exhaustive or to limit the invention to the precise forms disclosed. Many modifications and variations are possible in light of the above teaching The embodiments were chosen and described in order to explain the principles of the invention and their practical application to enable others skilled in the art to utilize the invention and various embodiments and with various modifications as are suited to the particular use contemplated.

What is claimed is:

1. A method for determining the location of a radio telephone device, said method comprising the steps of:

uniquely assigning a certain destination telephone number to a particular predetermined public safety answering point;

receiving a telephone call from said radiotelephone, said telephone call being directed to and uniquely identifying said destination telephone number;

identifying said destination telephone number from said received telephone call;

providing a first and a second radio finding device;

only after identifying said destination telephone number, causing said first and second radio finding devices to attempt to respectively determine the location of said radiotelephone device by use of signal angle information and, upon respectively determining said location, respectively providing location information;

determining whether both said first and said second radio finding devices respectively provided location information;

determining said location of said radiotelephone device only if said first and said second radio finding devices each respectively generate location information; and communicating said determined location to said public safety answering point.

2. A method for determining the location of a radiotelephone device, said method comprising the steps of:

uniquely assigning a certain destination telephone number to a particular predefined public safety answering point;

receiving a telephone call from said radio telephone, said telephone call being directed to said destination telephone number;

identifying said destination telephone number from said received telephone call;

providing at least three radio finding devices;

only after identifying said destination telephone number, causing said at least three radio finding devices to attempt to respectively determine the location of said radiotelephone device by use of angle information and, upon respectively determining said location, respectively providing location information;

determining whether at least two of said radio finding devices have respectively provided location information;

determining said location of said radio telephone device only if at least two of said at least there radio finding devices have respectively provided location information;

identifying each of said radio finding devices which have respectively provided location information;

creating unique pairs of said radio finding devices which have respectively provided location information;

using a triangulation process on the respectively generated location information from each of said created unique pairs of said radio finding devices, thereby creating a single location for each of said unique pairs of said radio finding devices;

fitting each single location for each of said unique pairs of said radio finding devices, thereby calculating said location of said radio telephone device; and communicating said calculated location to said particular predefined public safety answering point.

3. A method for determining the location of a radiotelephone device, said method comprising the steps of:

uniquely assigning a certain destination telephone member to a particular predefined public safety answering point;

receiving a telephone call from said radio telephone, said telephone call being directed to said destination telephone number, identifying said destination telephone number from said received telephone call;

providing at least three radio funding devices;

only after identifying said destination telephone member, causing said at least three radio finding devices to attempt to respectively determinate the location of said radiotelephone device by use of angle information and, upon respectively determining said location, respectively providing location information only if the respective signal angle information is greater than zero degrees;

determining whether at least two of said three radio finding devices have respectively provided location information;

determining said location of said radio telephone device only if at least two of said at least three radio finding devices have respectively provided location information;

creating unique pairs of said radio finding devices which have respectively provided location information;

for each of said unique pairs of radio finding devices, using a triangulation process to create a single location for each of said unique pairs of radio frequency devices, wherein said triangulation process uses the distance between said unique pair of radio frequency devices and the distance between one of said pair of radiofrequency devices and the particular predefined public safety answering point to provide the single location for said unique pair of radio frequency devices;

determining whether one of said single locations is far from the other locations;

discarding said one of said single locations only of said one of said single locations is for from the other locations;

fitting all remaining locations to calculate a location of said radiotelephone device; and communicating said calculated location of said radiotelephone device to said particular predefined public safety answering point.

* * * * *